June 11, 1957     L. J. KAUFMAN     2,795,095
LAWN TRIMMER WITH C-SHAPED GUARD
Filed Oct. 26, 1954     3 Sheets-Sheet 1
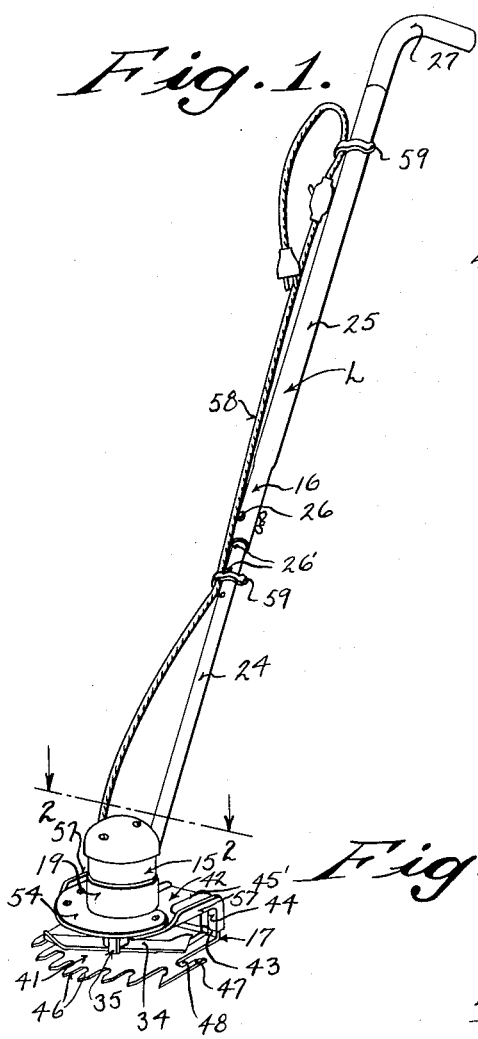
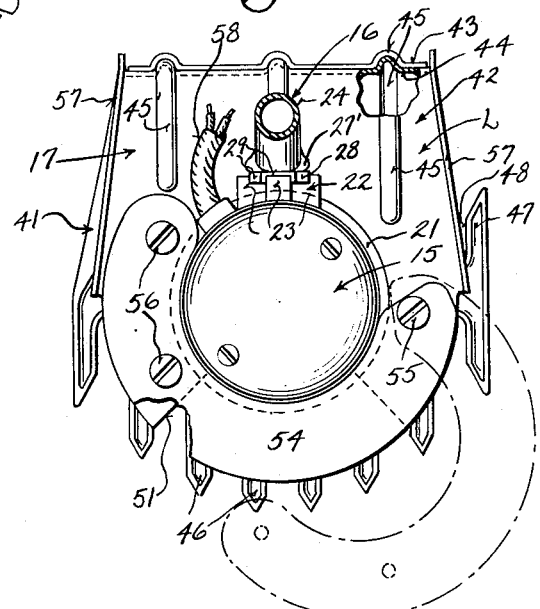
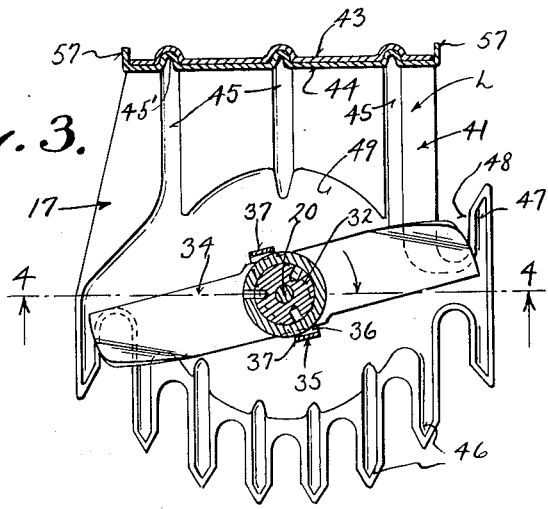
INVENTOR
LEONARD J. KAUFMAN
BY
ATTORNEYS

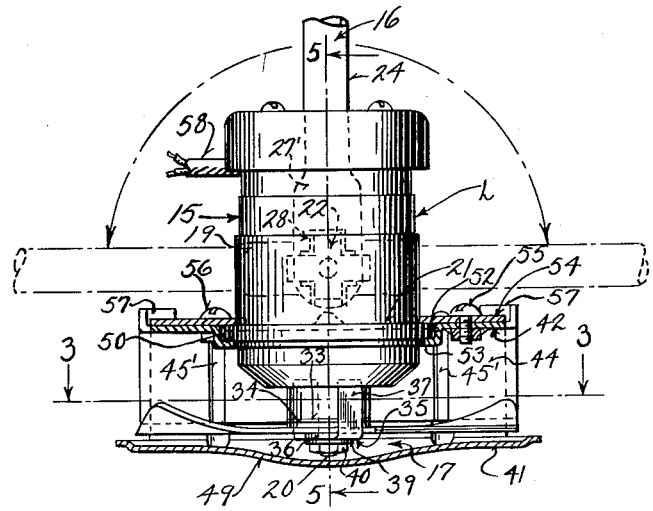

June 11, 1957  L. J. KAUFMAN  2,795,095
LAWN TRIMMER WITH C-SHAPED GUARD
Filed Oct. 26, 1954  3 Sheets-Sheet 3

INVENTOR
LEONARD J. KAUFMAN

BY Young & Wright

ATTORNEYS

United States Patent Office 2,795,095
Patented June 11, 1957

2,795,095

LAWN TRIMMER WITH C-SHAPED GUARD

Leonard J. Kaufman, Manitowoc, Wis., assignor to Kaufman Mfg. Co., Manitowoc, Wis., a corporation Application October 26, 1954, Serial No. 464,679

2 Claims. (Cl. 56—25.4)

This invention appertains to grass trimmers and lawn edgers and more particularly to a motor operated rotatable blade grass trimmer and edger.

One of the important objects of my invention is to provide a light, portable grass trimmer which can be easily manipulated and handled by an operator for effectively keeping a lawn in a proper cut condition.

Another salient object of my invention is to provide a lawn trimmer embodying an electric motor of the desired rating having secured thereto in a novel fashion a manipulating handle and a guard body for the rotatable cutter blade driven from the armature shaft of the motor.

A further object of my invention is to provide novel means for connecting the guard body with the motor housing, whereby the guard body can be turned bodily around on the motor to different positions to suit varying conditions and the individual desires of the operator.

Another further object of my invention is to provide novel means for detachably and adjustably connecting the handle to the motor housing, whereby the handle can be set at different angles relative to the motor and the guard body, the adjustment of the handle and the guard body on the motor functioning in combination to bring about the desired exact positioning of parts to permit easy reaching of the grass as desired by different operators.

A further important object of my invention is the provision of means whereby not only can the guard body be easily turned to a desired position on the motor, but whereby the entire guard body can be quickly removed by an operator for cleaning and for permitting an edger assembly to be instantly associated with the motor.

Another further important object of my invention is to provide an improved guard body for grass trimmers which will be durable in use and one which can be readily slid or carried over a lawn and tilted to cut grass to a desired close height.

A still further object of my invention is to provide a power lawn implement which can be quickly converted from a lawn trimmer to a lawn edger and vice versa, with a handle adjustment to permit perfect use of the implement for both purposes.

A still further object of my invention is to provide a lawn edger assembly which can be effectively used adjacent to sidewalks, curbs, flower beds and the like, and which embodies novel guides and depth gauges to insure the proper movement of the implement along a sidewalk and the like with the blade at a desired adjustment.

A still further important object of my invention is to provide a novel hub attachment for the cutter shaft and blade embodying novel guard fingers for effectively preventing the winding up of grass and the like around the shaft, the fingers functioning to break and throw the grass, etc., away from the hub and shaft.

With these and other objects in view, the invention consists in the novel construction, arrangement and formation of parts, as will be hereinafter more specifically described and claimed, and illustrated in the accompanying drawings, in which drawings, Figure 1 is a perspective view of my improved lawn implement, showing the same ready for use as a grass trimmer;

Figure 2 is an enlarged horizontal sectional view taken on the line 2—2 of Figure 1, looking in the direction of the arrows, the view showing the motor and the guard body in top plan, with parts broken away and in section, the view also showing the C-clamp plate in an open position in dotted lines to permit removal of the guard body from the motor;

Figure 3 is a horizontal sectional view taken on the line 3—3 of Figure 4, looking in the direction of the arrows, the view showing the cutter blade in plan;

Figure 4 is a fragmentary front elevational view of the device with the guard shown in section along line 4—4 of Figure 3;

Figure 5 is a vertical sectional view taken at right angles to Figure 4 and on the line 5—5 of Figure 4, looking in the direction of the arrows;

Figure 6 is a detail vertical sectional view taken on the line 6—6 of Figure 5, looking in the direction of the arrows, showing the means employed for adjustably holding the handle in a desired position;

Figure 7:
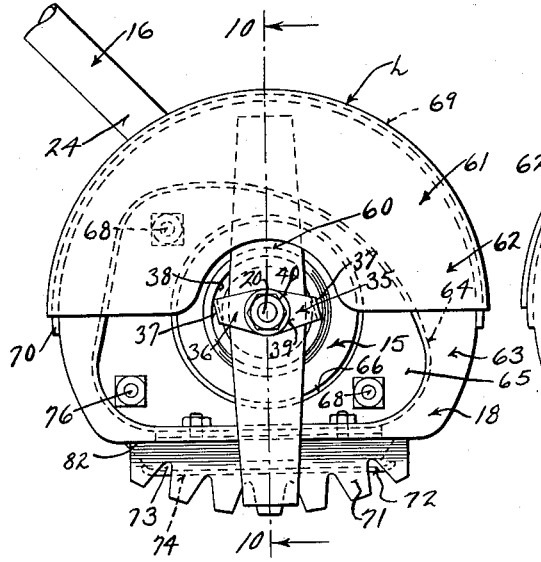
Figure 7 is a fragmentary side elevational view showing a modified form of my improved lawn implement, the grass trimmer guard body and guard plate being removed and illustrating the lawn edger and its blade substituted therefor.

Referring to the drawings in detail, wherein similar reference characters designate corresponding parts throughout the several views, the letter L generally indicates my improved lawn implement and the same embodies an electric motor 15 with which is detachably associated an elongated manipulating handle 16, a grass trimmer assembly 17 or a lawn edger assembly 18. Obviously, the grass trimmer assembly 17 is removed when the edger 18 is associated with the motor 15 and vice versa.

The electric motor 15 includes a casing or housing 19 and projecting outward from one end of the housing is the armature shaft 20. In accordance with my invention, the motor casing 19 has formed thereon an annular outstanding rib 21, the purpose of which will later appear. Formed on, or rigidly secured to the motor casing 19 at one side of the annular rib 21 is a fastening block 22 for the handle 16, and this block is of a cruciform in end elevation and cross section. This particular form of block defines outwardly extending right angularly disposed arms 23, the purpose of which will now appear.

The handle 16 includes inner and outer telescoping tubular sections 24 and 25 and these sections are slid one upon the other so that the active length of the handle can be adjusted. The sections can be held in a selected, adjusted position by means of a bolt 26 passing through an opening in the handle section 25 and any one of a plurality of openings 26' in the handle section 24. The outer end of the handle section 25 is curved to provide a hand grip 27, which may be suitably treated in any known manner (not shown) to prevent slipping of the hands thereon. The forward lower end of the handle section 24 is flattened and bent outwardly to provide an attaching foot 27' and this foot has secured to its inner face, a clamp plate 28 of a cruci-form in end elevation, and this provides right angularly extending arms 29. The arms 29 are of a U-shaped form in cross section so as to fit over the clamp block 23. Anchored to the axial center of the clamp block is a stud bolt 30 which passes through the clamp plate 28 and the foot 27'. A winged nut 31 is threaded on the bolt 30 against the foot for drawing the foot and the clamp plate 28 tight against the block 23. By loosening the winged nut 31 and moving the foot 27' and the clamp plate 28 outward, the handle 16 can be bodily turned on the bolt 30 to position the handle 16 at different angles relative to the motor 15.

Threaded on the armature shaft 20 is a shaft collar 32 and fitted against the collar is a spring washer 33. This washer is engaged by the grass cutter blade 34 which projects radially in opposite directions from the shaft.

One of the important features of the invention is the provision of means for preventing the winding of grass and other debris around the armature shaft, the motor casing and the cutter blade, and this means includes a wiper hub 35 consisting of a hub plate 36 having formed thereon right angularly extending inwardly directed wiper arms 37. The wiper arms are arranged off center of the axis of the hub plate 36 and the wiper arms are received in an annular raceway groove 38 formed in the motor casing. The wiper hub 35 rotates with the armature shaft and the cutter blade 34 and is held in place by a thrust washer 39. A nut 40 is threaded on the armature shaft against the thrust washer and this holds the entire assembly in place. The blade therefor is freely removable from the shaft simply by removing the nut 40. The shaft collar and consequently the armature shaft can be held against rotation by the use of a suitable implement of any type that may be inserted in openings 80 and 81 formed in the casing of the motor and in the collar respectively. During rotation of the wiper hub 35, the arms 37 effectively function to wipe all debris away from the motor and actually these arms tend to snap any material which is caught around the collar 32 and to throw this material by centrifugal force away from the motor casing and armature shaft.

The guard body 17 employed with the blade 34 is of a novel construction, and is preferably formed from sheet metal of the desired gauge for the sake of lightness of weight. This guard body includes a bottom guard plate 41 and an upper guard plate 42. These plates have formed on their inner ends inwardly extending overlapping flanges 43 and 44, respectively, and the flanges are rigidly secured together in any desired way. To add rigidity to the plates, the same are provided with outstruck ribs 45 and 45', respectively. The lower guard plate 41 has formed on its front leading edge a series of equidistantly spaced guard fingers 46 and the cutter blade rapidly rotates past these fingers. By referring to Figure 3, it can be seen that one side of the plate 41 in rear of the guard fingers 46, is provided with a rearwardly directed guard finger 47, and this provides in conjunction with the body portion of the bottom plate, a notch 48 for twigs and the like to facilitate the severing thereof. Directly in rear of the guard fingers 46 and in front of the flange 43 is provided a downwardly dished portion 49 which constitutes the riding surface of the guard and the implement to a certain extent, can be rocked on this dished portion to space the guard fingers 46 varying distances away from the ground.

The top plate 42 is provided with a substantially annular seat 50 for receiving the motor casing and the front edge of this seat is open to provide an entrance throat 51. The seat 50 includes a depending flange 52 which is adapted to snugly seat against the outer face of the rib 21 on the motor casing 19, and this flange 52 in turn carries a right angularly extending flange 53 which snugly receives the front face of the rib 21. To hold the guard body assembly 17 on the motor, a C-shaped clamp plate 54 is provided which is adapted to swing over the upper forward surface of the top plate 42 across the throat 51. One end of the plate is held in position by a pivot bolt 55 and the other end of the plate is rigidly secured in place by bolts 56. By removing the bolts 56, the clamp plate 54 can be swung to an open position as suggested in the dotted line showing in Figure 2 to permit the placing of the guard body on and off of the motor. This clamp plate 54 snugly engages and fits over the upper face of the rib 21. It is also obvious that by loosening the bolts 55 and 56 that the guard body can be moved circumferentially around the motor to a desired position. In order to further strengthen the top plate, the same can be provided at its side edges with reinforcing flanges 57, as shown.

The cord 58 for the motor can be extended along the handle 16 and secured thereto by clips 59. An extension cord (not shown), can be connected to this cord 58.

The grass trimmer is placed with the lower plate 41 on the ground and the circuit is closed through the motor 15, and the entire device is slid or carried over the grass to be trimmed. The rapidly rotating blade 34 in conjunction with the guard fingers will effectively sever the grass and the device is especially useful in close places, such as under growing plants and shrubbery and along the sides of lawns. The device is particularly suitable for cutting tall grass and in view of the construction of the trimmer the choking up of the cutter by tall grass and weeds is prevented.

Figure 8:
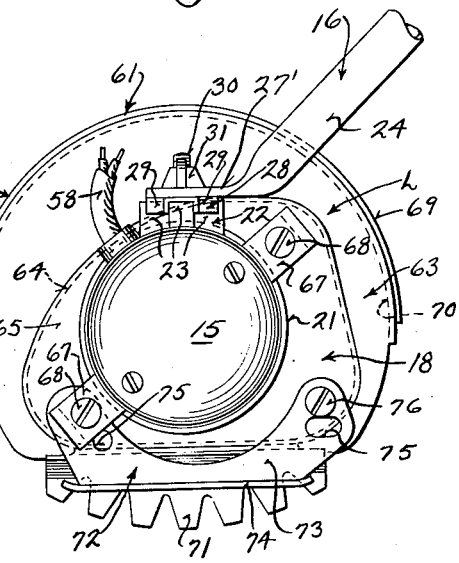
Figure 8 is a view similar to Figure 7, but showing the other side of the edger.
Figure 9:
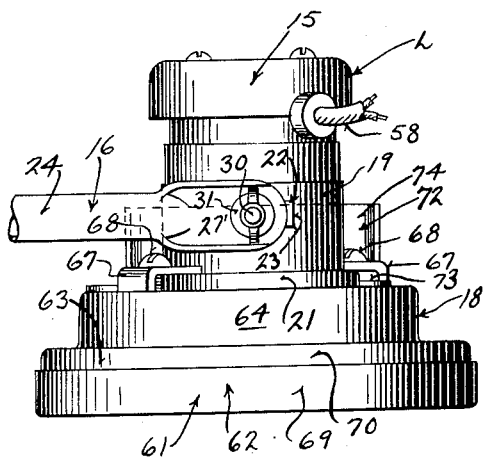
Figure 9 is a fragmentary top plan view showing the edger attached to the motor housing.
Figure 10:
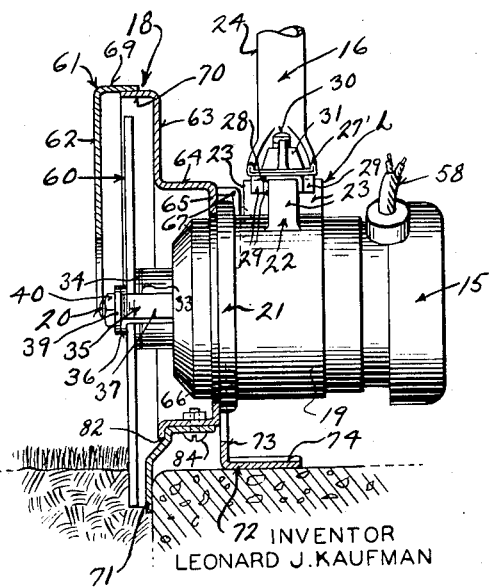
Figure 10 is a vertical sectional view taken on the line 10—10 of Figure 7, looking in the direction of the arrows.

The lawn implement has been so designed that the blade 34 and the guard body assembly 17 can be replaced by the assembly 18 for facilitating the edging of a lawn and for creating a small groove in the soil alongside of a sidewalk, curb or the like. This assembly 18 is shown in Figures 7 to 10, inclusive.

In use of the edger, the blade 34 is removed as well as the guard body 17, and a straight cutting blade 60 is utilized in lieu of the blade 34. The assembly 18 includes a guard body 61 for the edger blade and this guard body includes a substantially semi-circular outer plate 62 and a substantially circular inner plate 63. The lower edge, however, of the inner plate is cut off on a chord to provide a flat lower edge 82. The body portion of this inner plate 63 is struck inwardly, which defines a marginal wall 64 and a flat abutment plate 65. This abutment plate 65 has formed therein a circular opening 66 which snugly receives the motor casing and the abutment plate 65 is adapted to snugly fit against the front face of the rib 21 of the motor casing 19. L-shaped clamps 67 are employed for securing the edger guard on the motor and these clips or clamps engage the inner face of the rib 21 and are adjustably held in position by bolts 68 which extend through the clips 67 and into the abutment plate 65 of the guard. Obviously, by loosening the bolts 68 the edger guard can be turned about the motor casing. The inner and outer plates 62 and 63 are provided with inwardly directed overlapping flanges 69 and 70 which are rigidly secured together in any desired manner. Rigidly secured to the lower portion of the inner plate 63 by means of the bolts 84 is a depending toothed guard plate 71, which is adapted to bear against the vertical face of a sidewalk or curb. Rigidly and adjustably carried by the outer face of the abutment plate 65 of the inner portion 63 of the edger guard is a rider plate 72 and this rider plate is adapted to engage and slide over a horizontal face of a pavement or sidewalk. The rider plate includes an attaching flange 73 and the right angularly extending horizontally disposed curb or walk engaging flange 74. The attaching flange 73 is provided with a series of openings 75 at its terminals. Fastening bolts 76 can be passed through selected openings 75 and in fact, one of the bolts 68 for the clips 67 can be employed at one side of the rider plate.

When the implement is used as an edger, the motor is arranged in a horizontal position and the handle 16 is positioned on the motor housing in such a way that the same will extend laterally and upwardly from the motor housing. The rider plate 72 is placed on the walk or curb with the guard finger plate 71 hanging over the curb and this forms an effective guide for the edger and the edger can now be slid or pushed along the side of the walk or curb with ease. The blade wiping past the toothed guard plate 71 will effectively edge the lawn and remove the earth to a width and depth determined by the setting of the edger.

The guard body 71 is also adjustable bodily around the motor so that the operating handle can be placed at different heights to suit requirements of various individuals.

Various changes in details may be made without departing from the spirit or the scope of my invention, but what I claim as new is:

1. A lawn trimmer comprising an electric motor including a housing and an armature shaft protruding from one end of the housing, said housing having formed thereon adjacent to the protruding end of the armature shaft an annular rib, a manipulating handle secured to the housing, a cutter blade secured to the armature shaft for rotation therewithin substantially a horizontal plane, a guard body of a substantially U-shape in cross section including a bottom rider plate having guard fingers on its forward edge and an upper attaching plate, said upper attaching plate having a substantially annular seat with an open throat, said seat including an inwardly directed flange engaging the outer face of the rib and a right angularly extending flange engaging the front face of the rib, and a C-shaped clamp plate engaging the upper face of the rib and extending across the throat, means detachably securing the clamp plate to the top plate, and a wiper member detachably carried by the armature and blade including inwardly directed wiper arms rotatable about the housing, said wiper arms being disposed at right angles to said cutter blade.

2. A lawn trimmer comprising an electric motor including a housing and an armature shaft protruding from one end of the housing, said housing having formed thereon adjacent to the protruding end of the armature shaft an annular rib, a manipulating handle secured to the housing, a cutter blade secured to the armature shaft for rotation therewith in substantially a horizontal plane, a guard body of a substantially U-shape in cross section including a bottom rider plate having guard fingers on its forward edge and an upper attaching plate, said upper attaching plate having a substantially annular seat with an open throat, said seat including an inwardly directed flange engaging the outer face of the rib and a right angularly extending flange engaging the front face of the rib, means for closing said throat and holding said motor housing in place, and a wiper member detachably carried by the armature and blade including inwardly directed wiper arms rotatable about the housing, said wiper arms being disposed at right angles to said cutter blade.

References Cited in the file of this patent

UNITED STATES PATENTS

| | | |
|---|---|---|
| 2,404,504 | Klose | July 23, 1936 |
| 2,539,619 | Goodall | Jan. 30, 1951 |
| 2,651,159 | Rountree, Sr. | Sept. 8, 1953 |
| 2,653,381 | Rooke | Sept. 29, 1953 |
| 2,660,847 | Britten III | Dec. 1, 1953 |
| 2,672,002 | Nelson | Mar. 16, 1954 |
| 2,708,820 | Britten | May 24, 1955 |
| 2,722,095 | Farney | Nov. 1, 1955 |